US012573645B2

(12) United States Patent
Jang et al.

(10) Patent No.: US 12,573,645 B2
(45) Date of Patent: Mar. 10, 2026

(54) INTEGRATED STRUCTURE OF ION FILTER AND RESERVOIR

(71) Applicants: Hyundai Motor Company, Seoul (KR); Kia Corporation, Seoul (KR)

(72) Inventors: Wook Il Jang, Gyeonggi-do (KR); Tae Geum Kim, Seoul (KR); Soo Hwan Kim, Gyeonggi-do (KR); Ji Hyun Lee, Gyeonggi-do (KR); Jin Hun Lee, Gyeonggi-do (KR); Oh Tak Kwon, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 698 days.

(21) Appl. No.: 17/983,087

(22) Filed: Nov. 8, 2022

(65) Prior Publication Data

US 2023/0187661 A1 Jun. 15, 2023

(30) Foreign Application Priority Data

Dec. 10, 2021 (KR) ........................ 10-2021-0176549

(51) Int. Cl.
*H01M 8/04044* (2016.01)
*B01D 35/00* (2006.01)
*H01M 8/04007* (2016.01)
*H01M 8/04029* (2016.01)

(52) U.S. Cl.
CPC ........ *H01M 8/04044* (2013.01); *B01D 35/00* (2013.01); *H01M 8/04029* (2013.01); *H01M 8/04052* (2013.01); *H01M 8/04074* (2013.01); *H01M 2250/20* (2013.01)

(58) Field of Classification Search
None
See application file for complete search history.

(56) References Cited

U.S. PATENT DOCUMENTS

| | | | | |
|---|---|---|---|---|
| 2005/0106433 A1* | 5/2005 | Takemoto | ......... | H01M 8/04029 429/442 |
| 2014/0127600 A1* | 5/2014 | Na | ................... | H01M 8/04029 429/437 |
| 2015/0295254 A1* | 10/2015 | Desjardins | ........ | H01M 8/04044 210/94 |

FOREIGN PATENT DOCUMENTS

| | | | | | |
|---|---|---|---|---|---|
| JP | 2002298885 | * | 10/2002 | | |
| JP | 2020-021667 A | | 2/2020 | | |
| KR | 101592652 B1 | | 2/2016 | | |
| WO | WO-2014174982 A1 * | 10/2014 | | ................ | C02F 1/42 |

* cited by examiner

*Primary Examiner* — Jonathan Crepeau
(74) *Attorney, Agent, or Firm* — Fox Rothschild LLP

(57) ABSTRACT

Provided is an integrated structure of an ion filter and a reservoir according to an embodiment of the present disclosure. An integrated structure of an ion filter and a reservoir includes a reservoir storing coolant for cooling a fuel cell stack, an ion filter located inside the reservoir, and a control valve located inside the reservoir to be opened or closed so that the coolant flows into the ion filter, in which the reservoir is divided into a first region in which the ion filter is located by opening or closing the control valve and a second region that is a space other than the first region, and the first region and the second region are connected by an air vent unit through which air passes.

16 Claims, 10 Drawing Sheets

[FIG. 1]
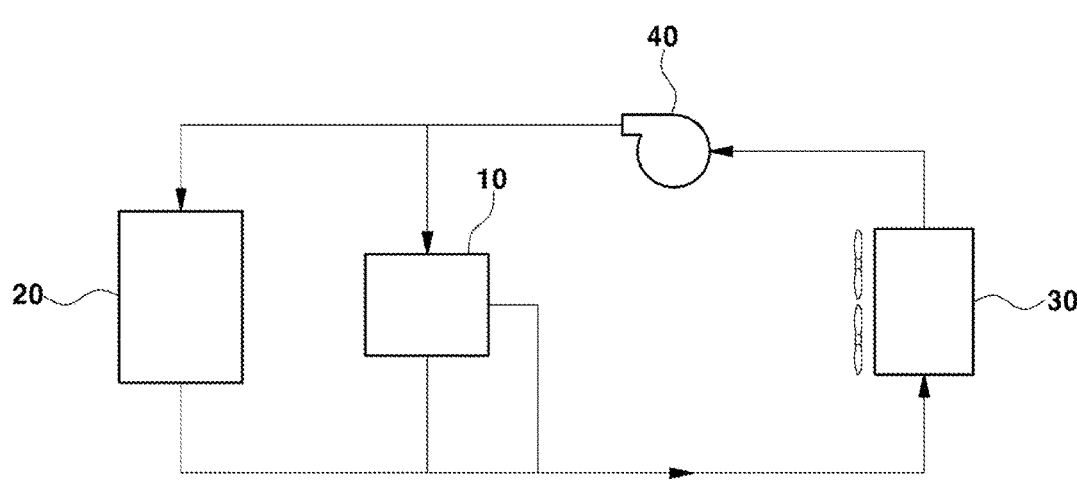

[FIG. 2]
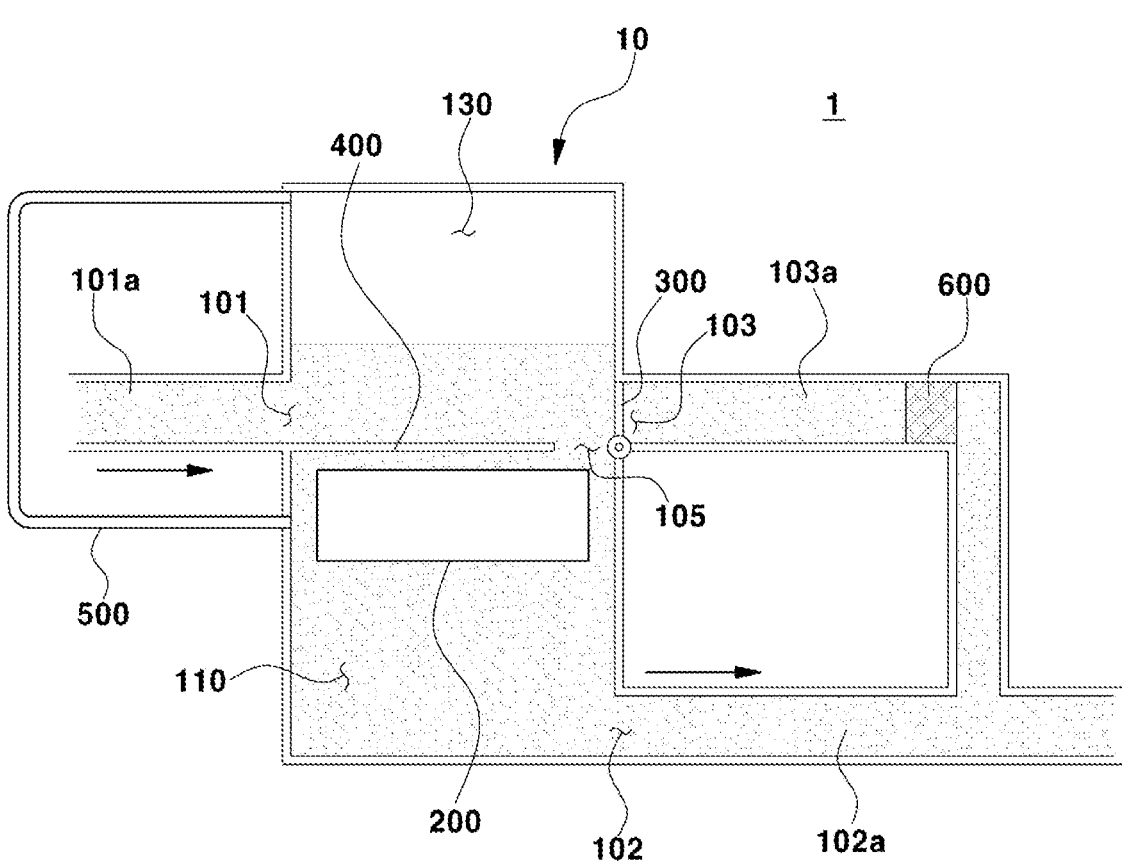

[FIG. 3]
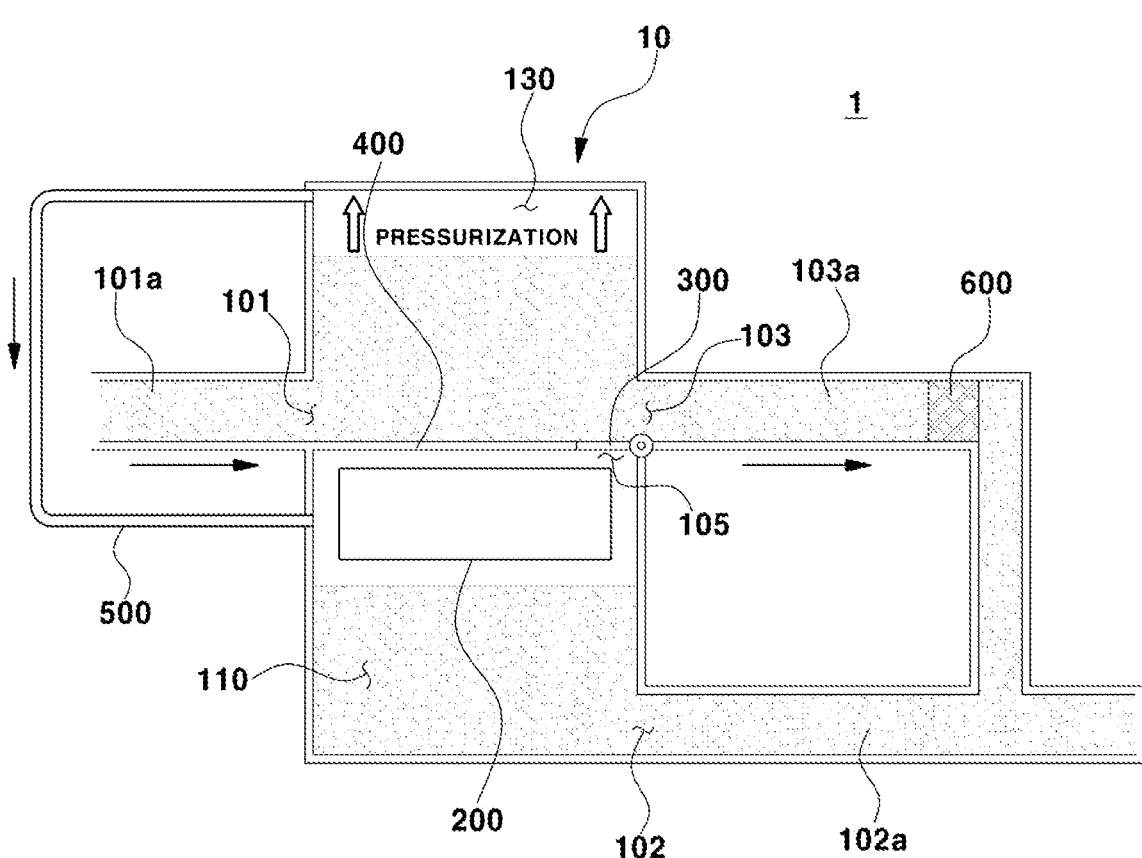

[FIG. 4]
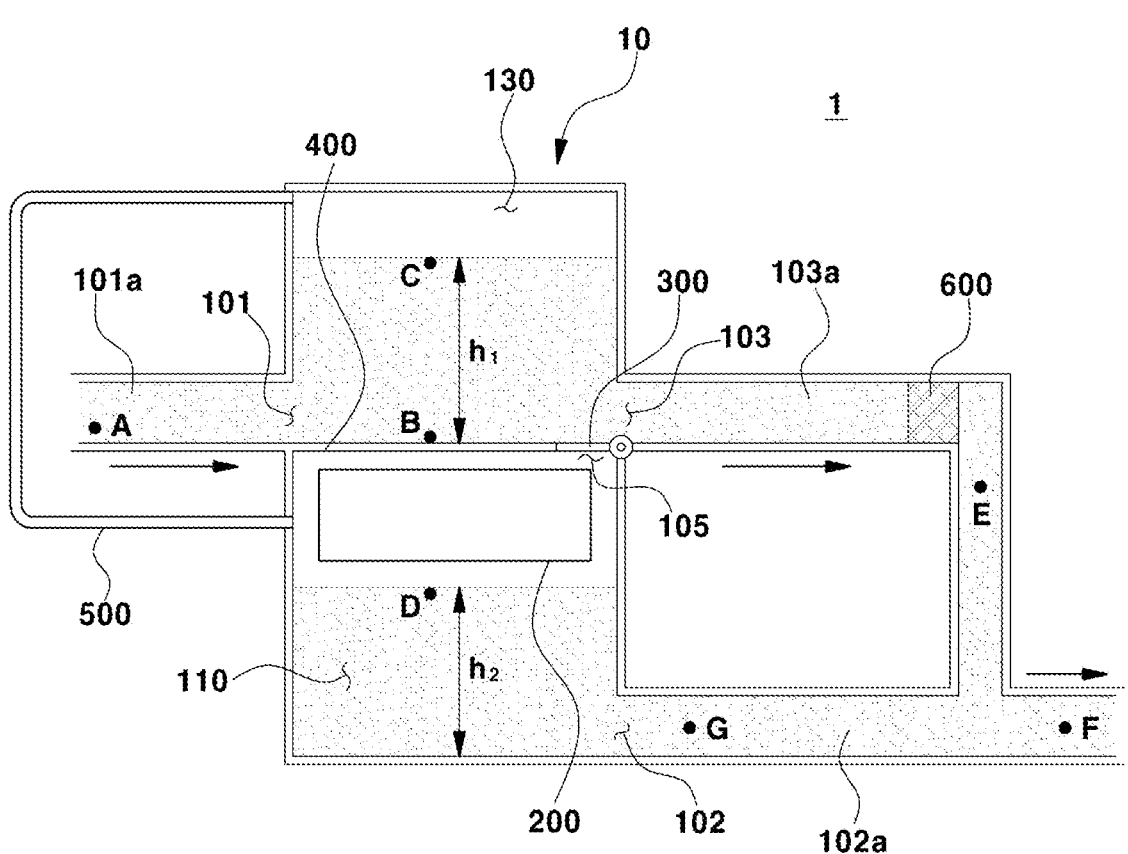

[FIG. 5]
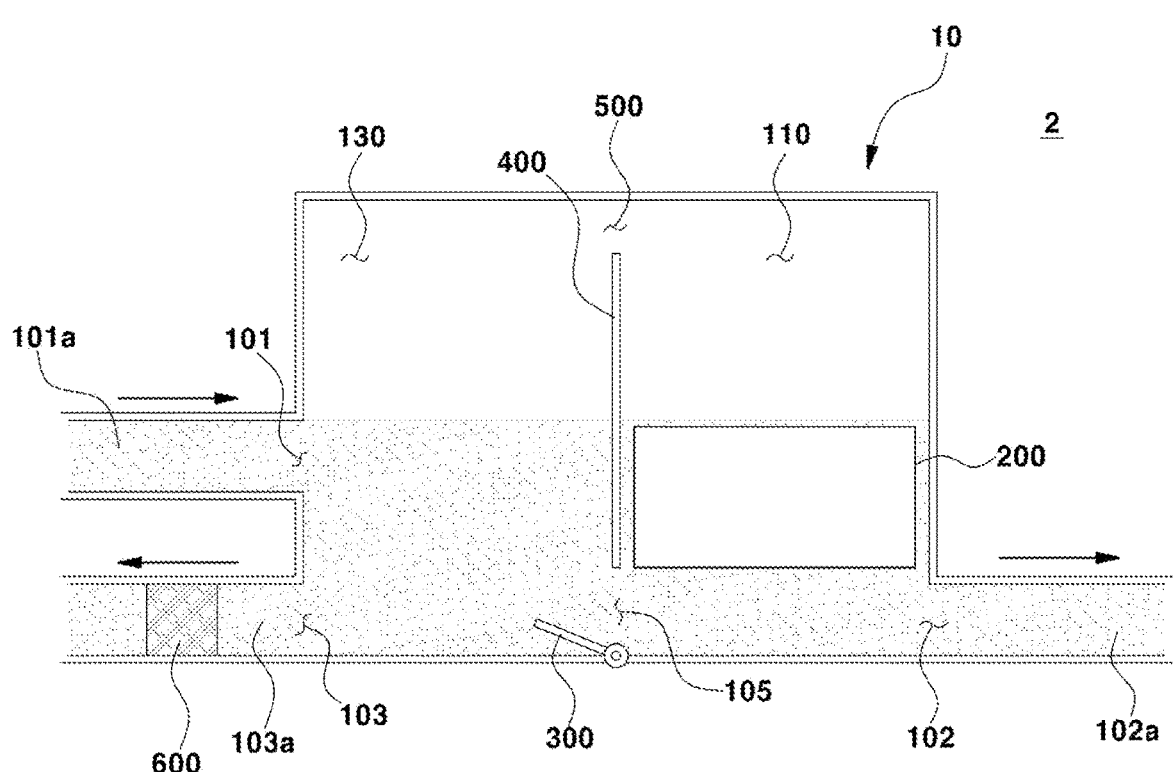

[FIG. 6]
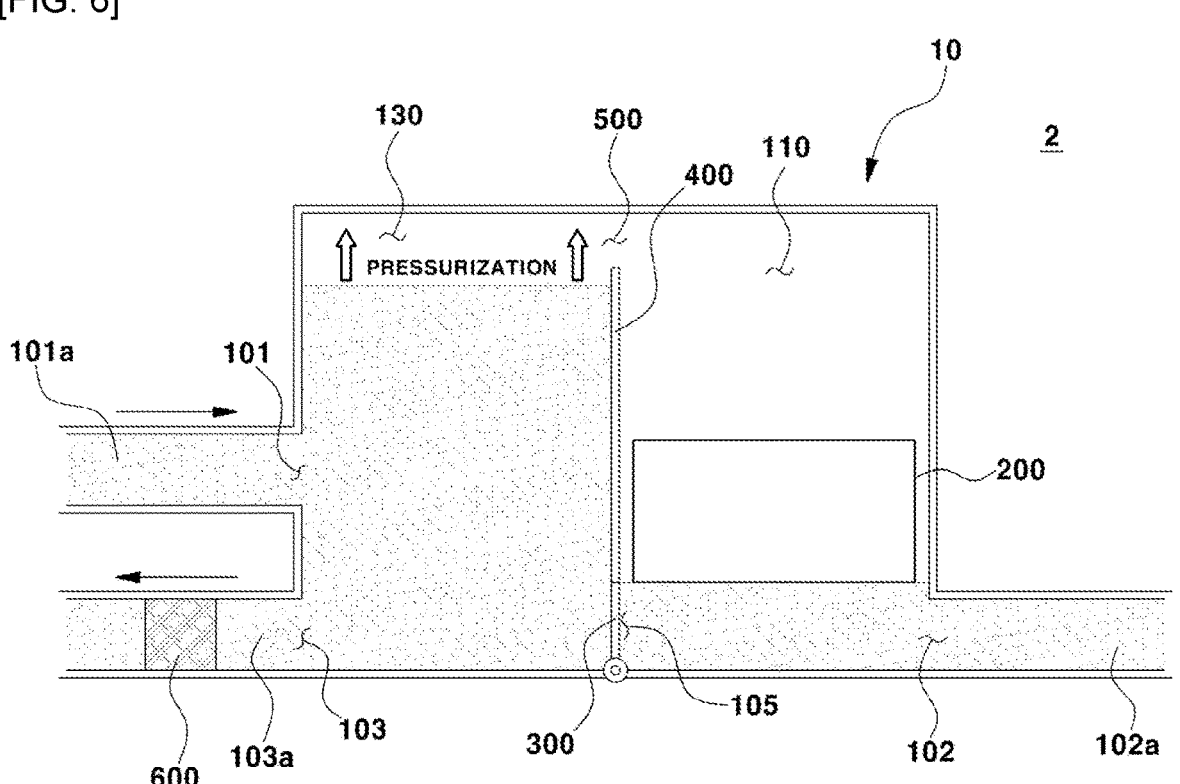

101a    101    PRESSURIZATION

200

600    103a    103    150    300    102    102a

[FIG. 9]
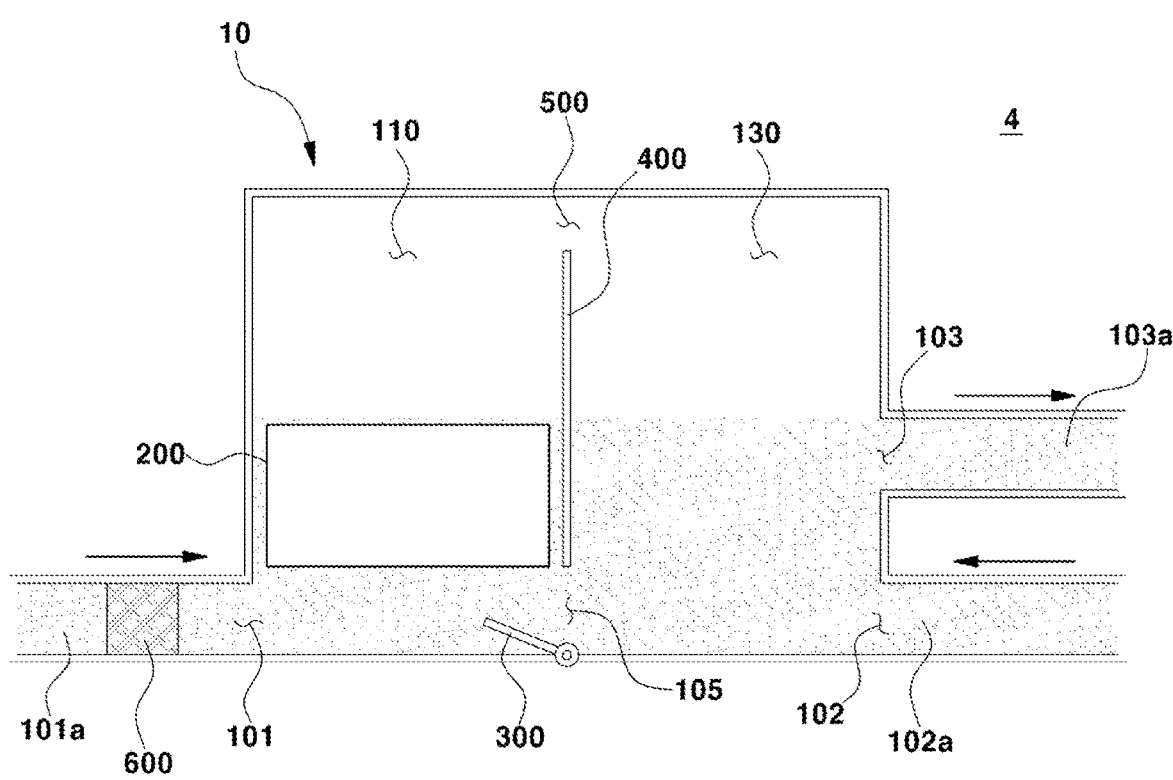

[FIG. 10]
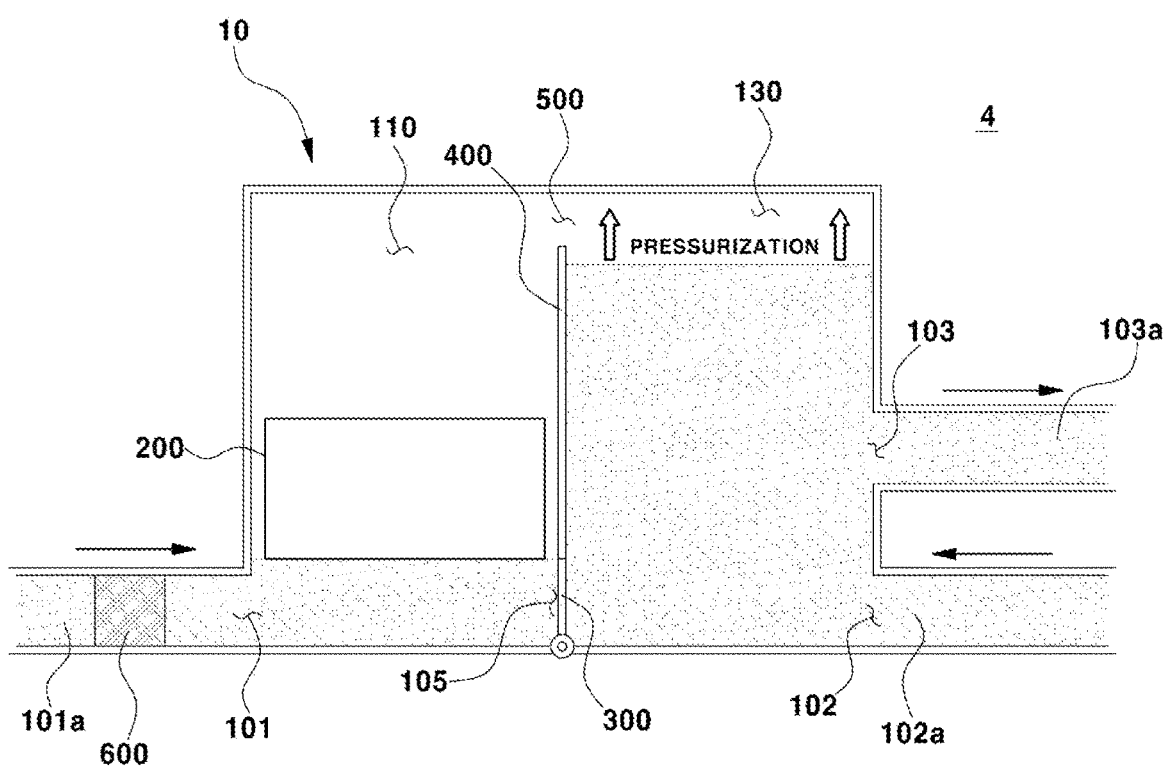

INTEGRATED STRUCTURE OF ION FILTER AND RESERVOIR

CROSS-REFERENCE TO RELATED APPLICATION

This application claims under 35 U.S.C. § 119(a) the benefit of Korean Patent Application No. 10-2021-0176549 filed on Dec. 10, 2021, the entire contents of which are incorporated herein by reference.

BACKGROUND

Technical Field

The present disclosure relates to an integrated structure of an ion filter and a reservoir provided with a control valve capable of controlling the flow of coolant with the ion filter embedded in the reservoir.

Background

A fuel cell system is a device for generating electric energy using a fuel cell and uses an electrochemical reaction. At this time, there is a need for an ion filter that removes internal ions to make the coolant used to prevent electric shock due to a voltage generated in the fuel cell stack an insulator.

The durability of the ion filter deteriorates due to a high-temperature coolant. Conventionally, the ion filter is mainly controlled by reducing the temperature of the coolant, but there is a problem in that the ion filter is continuously exposed to the coolant.

In addition, the durability of the ion filter may be improved by flowing the coolant into the ion filter only when it is necessary to remove the ions existing in the coolant by the ion filter, and by not exposing the ion filter to the coolant when it is not necessary to remove the ions. However, a system in which the ion filter is inserted and detached as necessary has problems in that the cost is increased and the configuration of the system is complicated.

The above information disclosed in this Background section is only for enhancement of understanding of the background of the disclosure and accordingly it may include information that does not form the prior art that is already known in this country to a person of ordinary skill in the art.

SUMMARY OF THE DISCLOSURE

An object of the present disclosure is to provide an integrated structure of an ion filter and a reservoir provided with a control valve capable of controlling the flow of coolant with the ion filter embedded in the reservoir.

Another object of the present disclosure is to provide an integrated structure of an ion filter and a reservoir, which exposes the ion filter to coolant only when it is necessary to remove ions existing in the coolant.

In one aspect, an integrated reservoir structure is provided, the structure comprising: (a) a reservoir configured for storing coolant for cooling a fuel cell stack; (b) an ion filter located inside the reservoir; and (c) a control valve located inside the reservoir to be opened or closed so that the coolant flows into the ion filter, wherein the reservoir is divided into a first region in which the ion filter is located and a second region that is distinct from the first region, wherein the first region and the second region are connected or linked by a vent unit, for example ana it vent unit through which air can pass.

In one embodiment, the first region and second region are non-overlapping. In another the embodiment, the first region and second regions are at least not 30, 40, 50, 60, 70, 80, 90 or 100 percent overlapping in surface area. In a yet another embodiment, the first and second regions may have some overlapping position, but function effectively as described herein.

In another aspect, provided is an integrated structure of an ion filter and a reservoir according to an embodiment of the present disclosure. An integrated structure of an ion filter and a reservoir includes a reservoir storing coolant for cooling a fuel cell stack, an ion filter located inside the reservoir, and a control valve located inside the reservoir to be opened or closed so that the coolant flows into the ion filter, in which the reservoir is divided into a first region in which the ion filter is located and a second region that is distinct from the first region, and wherein the first region and the second region are connected by an air vent unit through which air passes and the first region and the second region are communicated by the control valve.

According to one embodiment, the first region and the second region are divided by a partition wall member and the control valve, when the control valve is closed, the control valve and the partition wall member prevent the coolant from flowing from the second region to the first region, and when the control valve is opened, the coolant flows from the second region to the first region.

According to one embodiment, when the control valve is opened, an outlet provided in the second region of the reservoir is closed by the control valve, and when the control valve is closed, the outlet provided in the second region is opened.

According to one embodiment, when the control valve is opened, the coolant flows into the first region in which the ion filter is located, and the coolant flowing into the first region flows into the outlet provided in the first region of the reservoir through the ion filter.

According to one embodiment, when the control valve is closed, the coolant flows toward the outlet provided in the second region of the reservoir, and the flow rate of the coolant stored in the second region is increased by a differential pressure body disposed on a flow path connected to the outlet, and the air existing in the second region flows into the ion filter through the air vent unit and the coolant inside the ion filter is discharged to the first region.

According to one embodiment, the reservoir is provided with an inlet into which the coolant flows, and a first outlet and a second outlet through which the coolant is discharged, the first outlet is provided in the first region, and the inlet and the second outlet are provided in the second region, and the coolant flowing into the ion filter is discharged through the first outlet.

According to one embodiment, a first flow path connected to the first outlet and a second flow path connected to the second outlet are connected to each other, and a differential pressure body is disposed on the second flow path, so that a pressure difference between the first flow path and the second flow path occurs.

According to one embodiment, the differential pressure body has a differential pressure characteristic equal to or greater than a difference between a pressure according to the level of the coolant in the second region and a pressure according to the level of the coolant in the first region.

According to one embodiment, the first region is defined as a lower portion in the reservoir and the second region is defined as an upper portion in the reservoir with respect to a partition wall member that separates the first region and the second region.

According to one embodiment, the first region and the second region are horizontally disposed with respect to a partition wall member that separates the first region and the second region, the control valve is provided on one side of the partition wall member, a space between the other side of the partition wall member and an inner surface of the reservoir is defined as the air vent unit, and the air vent unit is defined on an upper portion of the reservoir.

According to one embodiment, the first region is provided with a first outlet through which the coolant is discharged, and the second region is provided with an inlet into which the coolant flows and a second outlet, and a differential pressure body is provided on a flow path connected to the second outlet.

According to one embodiment, when the control valve is closed, the air in the second region flows into the first region through the air vent unit by the coolant flowing into the second region and the coolant existing inside the ion filter is discharged to the first region.

According to one embodiment, the first region is provided with a first inlet into which the coolant flows, and the second region is provided with a second inlet into which the coolant flows and an outlet, and a differential pressure body is provided on a flow path connected to the first inlet.

According to one embodiment, each of the first region and the second region is defined by a separate housing, the air vent unit connects a first housing defining the first region to a second housing defining the second region, and an internal flow path through which the coolant flows is disposed between the first region and the second region, and the control valve is provided on the internal flow path.

According to one embodiment, the first housing is provided with a first outlet through which the coolant is discharged, and the second housing is provided with an inlet into which the coolant flows and a second outlet.

According to one embodiment, when the control valve is closed, the air in the second region flows into the first region through the air vent unit by the coolant flowing into the second housing and the coolant existing inside the ion filter is discharged to the first housing, and when the control valve is opened, the coolant flowing into the second housing flows into the ion filter in the first housing.

According to the embodiment of the present disclosure, the separate line for flowing the coolant cooled by the radiator to the ion filter may not be required because the ion filter is provided inside the reservoir. Accordingly, it is possible to reduce the number of lines to constitute the heat management system, thereby saving the cost and volume of the entire system.

According to the embodiment of the present disclosure, it is possible to discharge the coolant existing inside the ion filter in order to secure the durability of the ion filter when it is not necessary to remove the ions existing in the coolant by the ion filter. It is possible to discharge the coolant existing inside the ion filter by the air supplied to the ion filter, thereby preventing the phenomenon in which the ion filter is constantly exposed to the coolant to improve the durability of the ion filter.

According to the embodiment of the present disclosure, it is possible to discharge the coolant remaining in the ion filter to the outside using the pressure difference between the reservoirs divided into two regions, thereby improving the durability of the ion filter.

In some embodiments, a heat management system may be provided, the system comprising the integrated structure of the ion filter and the reservoir, a fuel cell stack, a radiator and a coolant pump. The coolant may flow into the fuel cell stack to cool down a chemical reaction of the fuel cell stack. The coolant heated by the chemical reaction may then flow into the radiator.

As discussed, the method and system suitably include use of a controller or processer.

In another embodiment, vehicles are provided that comprise an apparatus as disclosed herein.

The above and other features of the disclosure are discussed infra.

BRIEF DESCRIPTION OF THE DRAWINGS

The above and other features of the present disclosure will now be described in detail with reference to certain exemplary examples thereof illustrated in the accompanying drawings which are given herein below by way of illustration only, and thus are not limitative of the present disclosure, and wherein:

FIG. 1 is a diagram showing a heat management system according to an embodiment of the present disclosure.

FIG. 2 is a diagram showing a filtering mode of an integrated structure of an ion filter and a reservoir according to the embodiment of the present disclosure.

FIG. 3 is a diagram showing a normal mode of the integrated structure of the ion filter and the reservoir according to the embodiment of the present disclosure.

FIG. 4 is a diagram for describing a differential pressure characteristic of a differential pressure body according to the embodiment of the present disclosure.

FIGS. 5 and 6 are diagrams showing a first modified example of the integrated structure of the ion filter and the reservoir according to the embodiment of the present disclosure.

FIGS. 7 and 8 are diagrams showing a second modified example of the integrated structure of the ion filter and the reservoir according to the embodiment of the present disclosure.

FIGS. 9 and 10 are diagrams showing a third modified example of the integrated structure of the ion filter and the reservoir according to the embodiment of the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in section by the particular intended application and use environment.

In the figures, reference numbers refer to the same or equivalent sections of the present disclosure throughout the several figures of the drawing.

DETAILED DESCRIPTION

It is understood that the term "automotive" or "vehicular" or other similar term as used herein is inclusive of motor automotives in general such as passenger automobiles including sports utility automotives (operation SUV), buses, trucks, various commercial automotives, watercraft including a variety of boats and ships, aircraft, and the like, and includes hybrid automotives, electric automotives, plug-in hybrid electric automotives, hydrogen-powered automotives and other alternative fuel automotives (e.g., fuels derived from resources other than petroleum). As referred to herein, a hybrid automotive is an automotive that has two or more sources of power, for example both gasoline-powered and electric-powered automotives.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Advantages and features of the present disclosure, and a method of achieving them will become apparent with reference to the embodiments to be described later in detail in conjunction with the accompanying drawings. However, the present disclosure is not limited to the embodiments disclosed below but may be implemented in various different forms, and this embodiment is provided to allow the disclosure of the present disclosure to be complete and fully inform those skilled in the art to which the present disclosure pertains of the scope of the disclosure, and the present disclosure is only defined by the scope of the claims. The same reference numerals refer to the same elements throughout the specification.

In addition, the reason that the names of the components are classified into the first, the second, etc. in the present specification is to distinguish them because the names of the components are the same, and the names of the components are not necessarily limited to the order thereof in the following description.

The detailed description is illustrative of the present disclosure. In addition, the aforementioned description shows and describes preferred embodiments of the present disclosure, and the present disclosure may be used in various other combinations, modifications, and environments. In other words, changes or modifications are possible within the scope of the concept of the disclosure disclosed the present specification, the scope equivalent to the described disclosure, and/or the scope of technology or knowledge in the art. The described embodiment describes the best mode for implementing the technical spirit of the present disclosure, and various changes required in specific application fields and uses of the present disclosure are also possible. Accordingly, the detailed description of the disclosure is not intended to limit the present disclosure to the disclosed embodiments. In addition, the appended claims should be construed as also including other embodiments.

FIG. 1 is a diagram showing a heat management system according to an embodiment of the present disclosure. FIG. 1 is a diagram describing the exchange of coolant between a reservoir, a radiator, and a fuel cell stack in a heat management system, and is a schematic diagram in which parts irrelevant to the exchange of coolant are omitted.

Referring to FIG. 1, a reservoir 10, a fuel cell stack 20, a radiator 30, and a coolant pump 40 may be required to exchange coolant in the heat management system.

The reservoir 10 may be a space in which coolant for cooling the fuel cell stack 20 is stored. An ion filter (not shown) may be embedded inside the reservoir 10 according to the embodiment of the present disclosure. Ions contained in the coolant may be removed by the ion filter (not shown) inside the reservoir 10, and the coolant with the ions removed may flow into the radiator 30.

The fuel cell stack 20 may receive air and hydrogen to generate electric power through a chemical reaction. Coolant may flow into the fuel cell stack 20 to dissipate heat, which is a by-product generated by the chemical reaction of the fuel cell stack 20. The coolant having cooled the fuel cell stack 20 may flow into the radiator 30.

The radiator 30 may cool the coolant heated after the chemical reaction of the fuel cell stack 20 again. The radiator 30 may dissipate the heat of the coolant to the outside air. The coolant cooled by the radiator 30 may flow into a valve (not shown) for controlling the flow of the coolant.

The coolant pump 40 may supply the coolant delivered from the valve (not shown) to the fuel cell stack 20. The cooling water pump 40 may control the flow rate of the coolant. The coolant discharged from the coolant pump 40 may flow into the reservoir 10 and the fuel cell stack 20.

According to the embodiment of the present disclosure, since the ion filter (not shown) is provided inside the reservoir 10, a separate line for flowing the coolant cooled by the radiator 30 to the ion filter (not shown) may not be required. Accordingly, it is possible to reduce the number of lines to constitute the heat management system, thereby saving the cost and volume of the entire system.

FIG. 2 is a diagram showing a filtering mode of an integrated structure of an ion filter and a reservoir according to the embodiment of the present disclosure.

Referring to FIG. 2, the integrated structure 1 of the ion filter and the reservoir may include the reservoir 10, an ion filter 200, a control valve 300, and an air vent unit 500. The integrated structure 1 of the ion filter and the reservoir may mean a structure in which the ion filter 200 is embedded in the reservoir 10.

The reservoir 10 may be divided into a first region 110 in which the ion filter 200 is disposed and a second region 130 that is a space other than the first region 110. The first region 110 and the second region 130 may be communicated by opening or closing the control valve 300. The ion filter 200 may remove ions contained in the coolant. Specifically, the first region 110 and the second region 130 may be divided by a partition wall member 400 and the control valve 300. The first region 110 may be defined as a lower portion in the reservoir 10, and the second region 130 may be defined as an upper portion in the reservoir 10 with respect to the partition wall member 400. In other words, the ion filter 200 may be disposed under the partition wall member 400.

The reservoir 10 may be provided with an inlet 101 into which the coolant flows, a first outlet 102 through which the coolant is discharged, and a second outlet 103 through which the coolant is discharged. The first outlet 102 may be provided in the first region 110 of the reservoir 10, and the inlet 101 and the second outlet 103 may be provided in the second region 130 of the reservoir 10. The inlet 101 may be connected to a first flow path 101*a*, the first outlet 102 may be connected to a second flow path 102*a*, and the second outlet 103 may be connected to a third flow path 103*a*. The second flow path 102*a* and the third flow path 103*a* may be connected to each other.

The control valve 300 may control the flow direction of the coolant. Specifically, the control valve 300 may be located inside the reservoir 10 to be opened and closed so that the coolant flows into the ion filter 200. When the control valve 300 is closed, the control valve 300 and the partition wall member 400 may prevent the coolant from flowing from the second region 130 to the first region 110. When the control valve 300 is opened, the coolant may flow from the second region 130 to the first region 110. The opening of the control valve 300 may mean that a coolant flow path 105 through which the coolant flows between the first region 110 and the second region 130 is generated. In addition, the opening of the control valve 300 may mean that the control valve 300 disposed on one side of the partition wall member 400 blocks the second outlet 103. In other words, the opening and closing of the control valve 300 may mean the opening and closing of the coolant flow path 105.

The air vent unit 500 may deliver air between the first region 110 and the second region 130. Specifically, the air in the second region 130 may be supplied to the first region 110 or the ion filter 200 disposed in the first region 100 through the air vent unit 500 by pressurizing the air generated as the level of the coolant in the second region 130 is increased. The air vent unit 500 and the ion filter 200 may be directly connected, and when air is injected into the ion filter 200 by the air vent unit 500, the coolant existing inside the ion filter 200 may be discharged to the first region 110. Accordingly, it is possible to prevent a phenomenon in which the ion filter 200 is constantly exposed to the coolant and thus the durability of the ion filter 200 deteriorates.

A differential pressure body 600 may be disposed on the third flow path 103*a* connected to the second outlet 103. For example, the differential pressure body 600 may be an orifice having a relatively small diameter of the flow path. However, the type of differential pressure body 600 may not be especially limited. The differential pressure body 600 may have a differential pressure characteristic equal to or greater than a difference between a pressure according to the level of the coolant in the second region 130 and a pressure according to the level of the coolant in the first region 110. A pressure difference between the second flow path 102*a* and the third flow path 103*a* may be generated by the differential pressure body 600. A detailed description of the differential pressure characteristic of the differential pressure body 600 will be described later.

For example, in the filtering mode for removing the ions existing in the coolant, the control valve 300 may be opened. When the control valve 300 is opened, the coolant introduced through the inlet 101 may flow from the second region 130 to the first region 110 of the reservoir 10. Specifically, the coolant may flow into the ion filter 200 disposed in the first region 110. Ions contained in the coolant may be removed through the ion filter 200, and the coolant with the ions removed may be discharged through the first outlet 102 of the reservoir 10 to flow into a radiator (not shown).

FIG. 3 is a diagram showing a normal mode of the integrated structure of the ion filter and the reservoir according to the embodiment of the present disclosure. For simplifying the description, a description of contents overlapping those of FIG. 2 will be omitted.

Referring to FIG. 3, a normal mode of the integrated structure 1 of the ion filter and the reservoir may mean a case where it is not necessary to remove the ions existing in the coolant. In the normal mode of the integrated structure 1 of the ion filter and the reservoir, the control valve 300 may be closed. When the control valve 300 is closed, the coolant flow path 105 may be closed and the second outlet 103 defined in the second region 130 may be opened. When the control valve 300 is closed, the coolant may flow toward the second outlet 103 provided in the second region 130 of the reservoir 10. At this time, the flow rate of the coolant is limited by the differential pressure body 600 disposed on the third flow path 103*a* connected to the second outlet 103, so that the flow rate of the coolant stored in the second region 130 may be increased. In other words, the differential pressure of the first outlet 102 may be lower than that of the second outlet 103 by the differential pressure body 600 disposed on the third flow path 103*a*. In addition, since the coolant does not flow into the ion filter 200 or the first region 110, the pressure of the ion filter 200 or the first region 110 may be equally maintained, so that a pressure difference between the first region 110 and the second region 130 or between the second region 130 and the ion filter 200 may occur. When the flow rate of the coolant stored in the second region 130 is increased, the air existing inside the second region 130 may flow into the first region 110 or the ion filter 200 through the air vent unit 500. As the air is injected into the ion filter 200, the coolant within the ion filter 200 may be discharged to the first region 110. The coolant discharged to the first region 110 may not be discharged through the first outlet 102. In other words, the coolant may be discharged only through the third flow path 103*a* connected to the second outlet 103.

According to the embodiment of the present disclosure, when it is not necessary to remove the ions existing in the coolant by the ion filter 200, the coolant within the ion filter 200 may be discharged to secure the durability of the ion filter 200. The coolant existing inside the ion filter 200 may be discharged by the air supplied to the ion filter 200, thereby preventing the phenomenon in which the ion filter 200 is constantly exposed to the cooling water.

FIG. 4 is a diagram for describing a differential pressure characteristic of a differential pressure body according to the embodiment of the present disclosure. A description of the contents overlapping those of FIG. 3 will be omitted.

Referring to FIG. 4, in the normal mode, pressures at various positions inside the integrated structure 1 of the ion filter and the reservoir will be described. A pressure at a point A may mean the pressure of the inlet 101 of the reservoir 10. Pressures at the points B and C may mean pressures according to different coolant height levels in the second region 130. A pressure at a point D may mean the pressure according to the height level of the coolant in the first region 110. Since a pressure difference according to the height levels of the points E and F may be calculated by including the pressure drop effect by the differential pressure body 600, the pressures of the points E and F may be calculated as having the same values. The pressures at the points E and F may be the same as each other, and the pressures at the points E and F may mean the pressure of the coolant discharged from the reservoir 10. A pressure at a point G may mean the pressure of the first outlet 102 or the second flow path 102*a* of the reservoir 10.

According to the Bernoulli equation, the sum of potential energy according to the height with respect to the reference point, kinetic energy according to a speed at which fluid flows, and work (energy) according to a pressure may be the same at different points. At this time, the Bernoulli's equation may be applied only to the points A, B, E, and F where the incompressible fluid flows along a stream line.

$$P + 1/2\rho V^2 + \rho gH = \text{const}$$

At this time, P may refer to a static pressure, $\rho$ may refer to a density of the coolant, V may refer to a speed of the coolant, and H may refer to a height. In addition, $$\frac{1}{2}\rho V^2$$

may refer to a dynamic pressure, and $\rho gH$ may refer to a potential pressure.

When the pressure at the point A is defined as P1 and the pressure at the point F is defined as P2, the pressure at the point B and the pressure at the point C are as follows. At this time, P may refer to any pressure.

Pressure at the point B=pressure at the point $$A = P + \frac{1}{2}\rho V^2$$

Pressure at the point C=P−$\rho gh1$

When the pressure at the point G is defined as P', the pressure at the point F and the pressure at the point D are as follows.

$$\text{Pressure at the point } F = P2 = P' + \frac{1}{2}\rho V^2$$

$$\text{Pressure at the point } D = P' - \rho gh2$$

Since the pressure drop by the differential pressure body 600 is P1-P2, it is as follows.

$$\text{Pressure drop}(\Delta P) = P1 - P2 = P - P'$$

At this time, when the pressure at the point C is greater than or equal to the pressure at the point D, air may flow from the second region 130 to the first region 110.

Pressure at the point C≥Pressure at the point D $$P - \rho gh1 \geq P' - \rho gh2$$

$$P - \rho gh1 \geq P' - \rho gh2$$

$$\Delta P = P - P' \geq \rho g(h1 - h2)$$

In conclusion, when the pressure drop of the differential pressure body 600 may be appropriately designed in consideration of the difference value between the pressure according to the level of the coolant in the second region 130 and the pressure according to the level of the coolant in the first region 110, the ion filter 200 may be prevented from being constantly exposed to the coolant.

FIGS. 5 and 6 are diagrams showing a first modified example of the integrated structure of the ion filter and the reservoir according to the embodiment of the present disclosure. FIG. 5 shows an operation of the control valve in the filtering mode, and FIG. 6 shows the operation of the control valve in the normal mode. For simplifying the description, a description of overlapping contents will be omitted.

Referring to FIG. 5, the first region 110 and the second region 130 may be horizontally disposed with respect to the partition wall member 400 that separates the first region 110 and the second region 130. The ion filter 200 may be disposed in the first region 110. The control valve 300 may be provided on one side of the partition wall member 400, and a space between the other side of the partition wall member 400 and the inner surface of the reservoir 10 may be defined as the air vent unit 500. The air vent unit 500 may be defined on the upper portion of the reservoir 10, and the control valve 300 may be disposed on the lower portion in the reservoir 10. In other words, the control valve 300 may be disposed on the lower portion in the reservoir 10 to prevent the coolant from flowing from the second region 130 to the first region 110 together with the partition wall member 400. In addition, when the control valve 300 is opened, the coolant may flow from the second region 130 to the first region 110 through the coolant flow path 105 defined on one side of the partition wall member 400 by opening the control valve 300. When the flow rate of the coolant stored in the second region 130 is increased, the air vent unit 500 may supply the air in the second region 130 to the first region 110.

The first outlet 102 through which the coolant is discharged may be provided in the first region 110, and the inlet 101 into which the coolant flows and the second outlet 103 may be provided in the second region 130. The differential pressure body 600 may be provided on the third flow path 103*a* connected to the second outlet 103.

According to the embodiment, the control valve 300 may be opened in the filtering mode. When the control valve 300 is opened, the coolant flowing into the second region 130 may flow into the first region 110 through the coolant flow path 105. The coolant flowing into the first region 110 may be discharged to the first outlet 102 with the ions removed by the ion filter 200. In addition, the coolant may be discharged even through the second outlet 103, and the second flow path 102*a* connected to the first outlet 102 and the third flow path 103*a* connected to the second outlet 103 may be connected to each other.

Referring to FIG. 6, the control valve 300 may be closed in the normal mode. When the control valve 300 is closed, the air in the second region 130 may be pressurized by the coolant flowing into the second region 130. The pressurized air in the second region 130 may flow into the first region 110 through the air vent unit 500. The coolant existing inside the ion filter 200 may be discharged to the first region 110 by the pressure of the air flowing into the first region 110. At this time, the coolant may be discharged through the second outlet 103. In other words, the coolant existing inside the ion filter 200 may be discharged to the first region 110 so that the ion filter 200 may not be exposed to the coolant.

Figure 7:
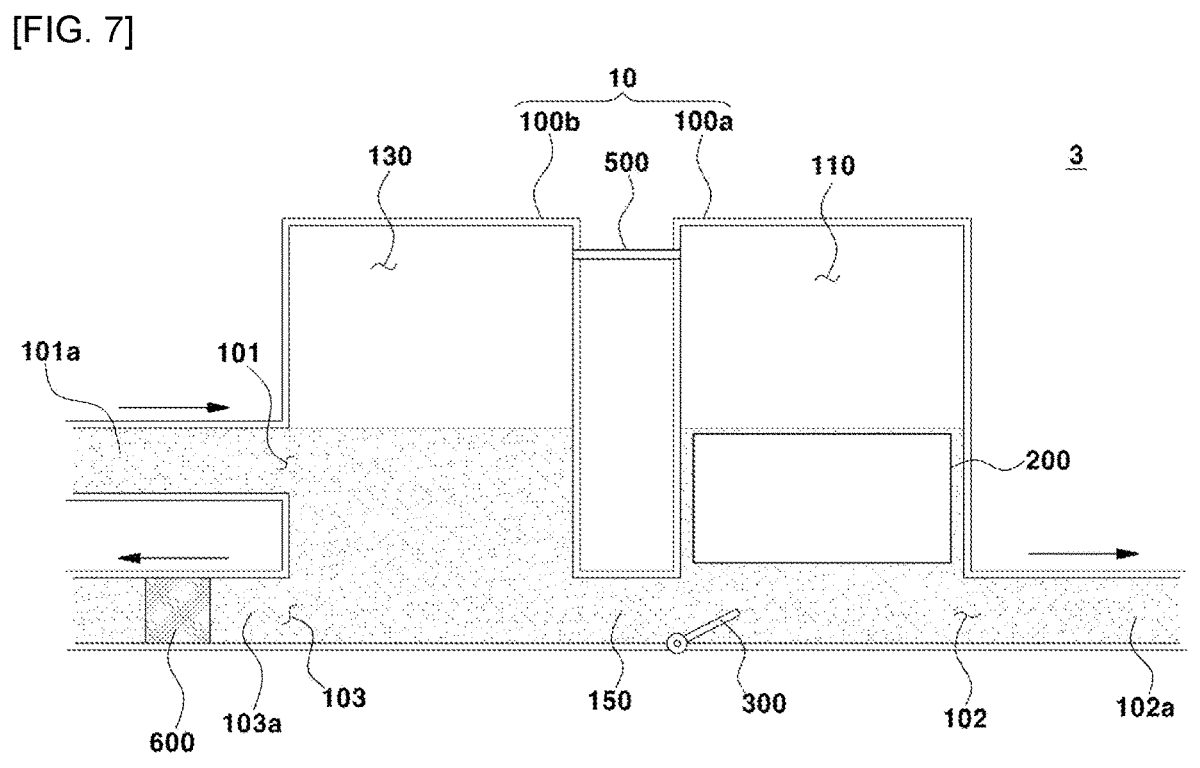
Figure 8:
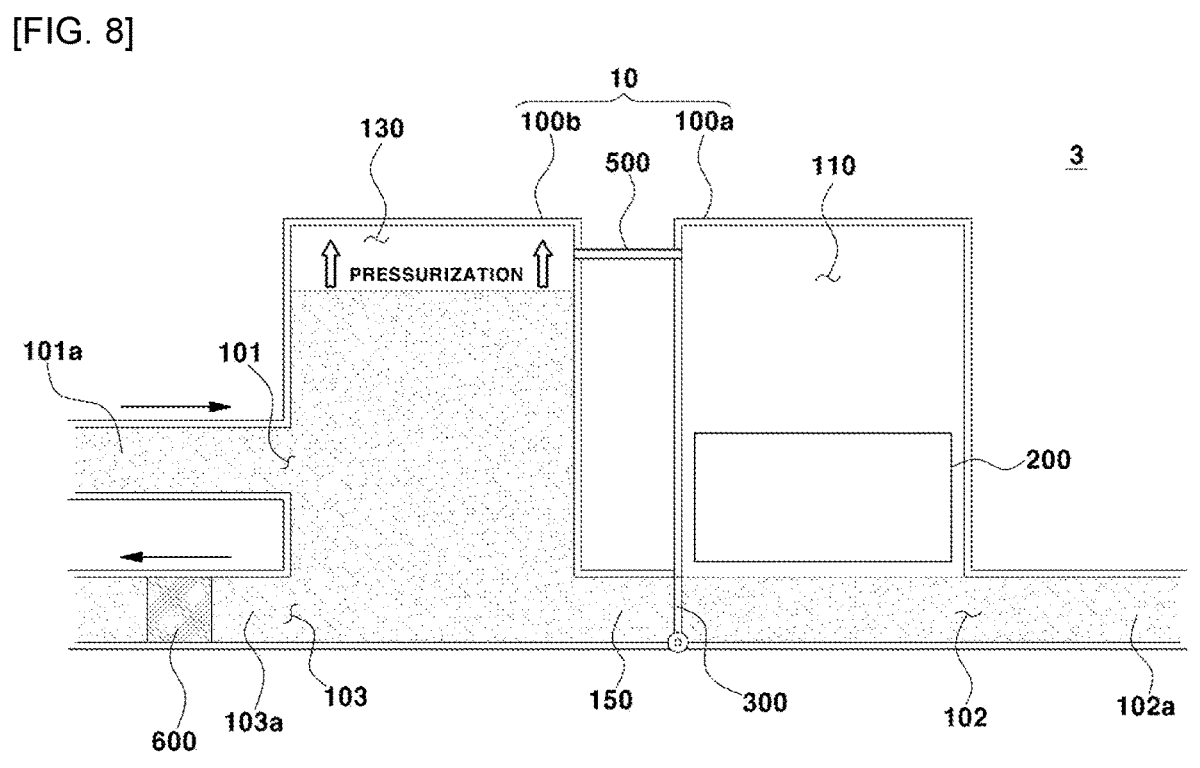

FIGS. 7 and 8 are diagrams showing a second modified example of the integrated structure of the ion filter and the reservoir according to the embodiment of the present disclosure. FIG. 7 shows the operation of the control valve in the filtering mode, and FIG. 8 shows the operation of the control valve in the normal mode. For simplifying the description, a description of overlapping contents will be omitted.

Referring to FIG. 7, an integrated structure 3 of the ion filter and the reservoir may include the reservoir 10 including a first housing 100a and a second housing 100b. In other words, the first region 110 in which the ion filter 200 is embedded and the second region 130 that is the space other than the first region 110 may be defined, respectively by separate housings 100a, 100b. The first housing 100a and the second housing 100b may be connected to each other by an internal flow path 150 and an air vent unit 500. The internal flow path 150 may be a configuration for flowing the coolant between the first region 110 and the second region 130. The control valve 300 may be provided on the internal flow path 150. The air vent unit 500 may connect the first housing 100a defining the first region 110 and the second housing 100b defining the second region 130 to supply the air from the second region 130 to the first region 110. The internal flow path 150 may be defined on the lower portion in the reservoir 10, and the air vent unit 500 may be defined on the upper portion in the reservoir 10.

The first housing 100a may be provided with the first outlet 102 through which the coolant is discharged, and the second housing 100b may be provided with the inlet 101 into which the coolant flows and the second outlet 103. The differential pressure body 600 may be disposed on the third flow path 103a connected to the second outlet 103.

According to the embodiment, the control valve 300 may be opened in the filtering mode. When the control valve 300 is opened, the coolant flowing into the second housing 100b may flow into the ion filter 200 in the first housing 100a. The coolant with the ions removed by the ion filter 200 may be discharged through the first outlet 102. In addition, the coolant may be discharged through the second outlet 103. The second flow path 102a connected to the first outlet 102 and the third flow path 103a connected to the second outlet 103 may be connected to each other.

Referring to FIG. 8, the control valve 300 may be closed in the normal mode. When the control valve 300 is closed, the air existing in the second region 130 may be pressurized by the coolant flowing into the second housing 100b. The pressurized air in the second housing 100b may flow into the first region 110 through the air vent unit 500, and the coolant existing inside the ion filter 200 may be discharged to the first housing 100a by the pressure of the introduced air. In other words, the coolant existing inside the ion filter 200 may be discharged to the first region 110 so that the ion filter 200 may not be exposed to the coolant.

FIGS. 9 and 10 are diagrams showing a third modified example of the integrated structure of the ion filter and the reservoir according to the embodiment of the present disclosure. FIG. 9 shows the operation of the control valve in the filtering mode, and FIG. 10 shows the operation of the control valve in the normal mode. For simplifying the description, a description of overlapping contents will be omitted.

Referring to FIG. 9, an integrated structure 4 of the ion filter and the reservoir may have two inlets 101, 102 and one outlet 103. The first region 110 and the second region 130 may be horizontally disposed with respect to the partition wall member 400 that separates the first region 110 and the second region 130. The ion filter 200 may be disposed in the first region 110. The control valve 300 may be provided on one side of the partition wall member 400, and a space between the other side of the partition wall member 400 and the inner surface of the reservoir 10 may be defined as the air vent unit 500. The air vent unit 500 may be defined on the upper portion of the reservoir 10, and the control valve 300 may be disposed on the lower portion in the reservoir 10. In other words, the control valve 300 may be disposed on the lower portion in the reservoir 10 to prevent the coolant from flowing from the second region 130 to the first region 110 together with the partition wall member 400. In addition, when the control valve 300 is opened, the coolant may flow from the second region 130 to the first region 110 through the coolant flow path 105 defined on one side of the partition wall member 400 by opening the control valve 300. When the flow rate of the coolant stored in the second region 130 is increased, the air vent unit 500 may supply the air in the second region 130 to the first region 110.

The first inlet 101 into which the coolant flows may be provided in the first region 110, and the second inlet 102 into which the coolant flows and the outlet 103 through which the coolant is discharged may be provided in the second region 130. The differential pressure body 600 may be provided on the first flow path 101a connected to the first inlet 101.

According to the embodiment, the control valve 300 may be opened in the filtering mode. When the control valve 300 is opened, the coolants flowing into the first region 110 and the second region 130 may flow into the ion filter 200 in the first region 110. The coolant with the ions removed by the ion filter 200 may be discharged to the first region 110 and the second region 130, and the coolant existing in the second region 130 may be discharged to the outlet 103. In addition, the coolant may be discharged through the outlet 103.

Referring to FIG. 10, the control valve 300 may be closed in the normal mode. When the control valve 300 is closed, the air in the second region 130 may be pressurized by the coolant flowing into the second region 130. Since the differential pressure body 600 is disposed on the first flow path 101a connected to the first inlet 101 of the first region 110, the flow rate of the coolant flowing into the first region 110 may be relatively less than the flow rate of the coolant flowing into the second region 130. Accordingly, the air in the second region 130 may be pressurized by the flow rate of the coolant flowing into the second region 130, and the pressurized air may flow into the first region 110 through the air vent unit 500. The coolant existing inside the ion filter 200 may be discharged to the first region 110 by the pressure of the air flowing into the first region 110. At this time, the coolant may be discharged through the outlet 103. In other words, the coolant existing inside the ion filter 200 may be discharged to the first region 110 so that the ion filter 200 may not be exposed to the coolant.

While the embodiments of the present disclosure have been described above with reference to the accompanying drawings, those skilled in the art to which the present disclosure pertains will be able to understand that the present disclosure may be carried out in different specific forms without changing the technical spirit or essential features thereof. Accordingly, it should be understood that the afore-mentioned embodiments are illustrative and not restrictive in all respects.

What is claimed is:

1. An integrated structure of an ion filter and a reservoir, the integrated structure comprising:

a reservoir configured for storing coolant for cooling a fuel cell stack;

an ion filter located inside the reservoir; and a control valve located inside the reservoir to be opened or closed so that the coolant can flow into the ion filter, wherein the reservoir is divided into a first region in which the ion filter is located and a second region that is distinct from the first region, and wherein the first region and the second region are con-nected by an air vent unit through which air passes, wherein the first region and the second region are com-municated by the control valve.

2. The integrated structure of the ion filter and the reservoir of claim 1, wherein the first region and the second region are divided by a partition wall member and the control valve, wherein when the control valve is closed, the control valve and the partition wall member prevent the coolant from flowing from the second region to the first region, and wherein when the control valve is opened, the coolant flows from the second region to the first region.

3. The integrated structure of the ion filter and the reservoir of claim 1, wherein when the control valve is opened, an outlet provided in the second region of the reservoir is closed by the control valve, and wherein when the control valve is closed, the outlet provided in the second region is opened.

4. The integrated structure of the ion filter and the reservoir of claim 3, wherein when the control valve is opened, the coolant flows into the first region in which the ion filter is located, and wherein the coolant flowing into the first region flows into the outlet provided in the first region of the reservoir through the ion filter.

5. The integrated structure of the ion filter and the reservoir of claim 1, wherein when the control valve is closed, the coolant flows toward the outlet provided in the second region of the reservoir, and wherein the flow rate of the coolant stored in the second region is increased by a differential pressure body disposed on a flow path connected to the outlet, and the air existing in the second region flows into the ion filter through the air vent unit and the coolant inside the ion filter is discharged to the first region.

6. The integrated structure of the ion filter and the reservoir of claim 1, wherein the reservoir is provided with an inlet into which the coolant flows, and a first outlet and a second outlet through which the coolant is discharged, wherein the first outlet is provided in the first region, and the inlet and the second outlet are provided in the second region, and wherein the coolant flowing into the ion filter is dis-charged through the first outlet.

7. The integrated structure of the ion filter and the reservoir of claim 6, wherein a first flow path connected to the first outlet and a second flow path connected to the second outlet are connected to each other, and wherein a differential pressure body is disposed on the second flow path, so that a pressure difference between the first flow path and the second flow path occurs.

8. The integrated structure of the ion filter and the reservoir of claim 7, wherein the differential pressure body has a differential pressure characteristic equal to or greater than a dif-ference between a pressure according to the level of the coolant in the second region and a pressure according to the level of the coolant in the first region.

9. The integrated structure of the ion filter and the reservoir of claim 1, wherein the first region is defined as a lower portion in the reservoir and the second region is defined as an upper portion in the reservoir with respect to a partition wall member that separates the first region and the second region.

10. The integrated structure of the ion filter and the reservoir of claim 1, wherein the first region and the second region are hori-zontally disposed with respect to a partition wall mem-ber that separates the first region and the second region, wherein the control valve is provided on one side of the partition wall member, wherein a space between the other side of the partition wall member and an inner surface of the reservoir is defined as the air vent unit, and wherein the air vent unit is defined on an upper portion of the reservoir.

11. The integrated structure of the ion filter and the reservoir of claim 10, wherein the first region is provided with a first outlet through which the coolant is discharged, and the second region is provided with an inlet into which the coolant flows and a second outlet, and wherein a differential pressure body is provided on a flow path connected to the second outlet.

12. The integrated structure of the ion filter and the reservoir of claim 11, wherein when the control valve is closed, the air in the second region flows into the first region through the air vent unit by the coolant flowing into the second region and the coolant existing inside the ion filter is dis-charged to the first region.

13. The integrated structure of the ion filter and the reservoir of claim 10, wherein the first region is provided with a first inlet into which the coolant flows, and the second region is provided with a second inlet into which the coolant flows and an outlet, and wherein a differential pressure body is provided on a flow path connected to the first inlet.

14. The integrated structure of the ion filter and the reservoir of claim 1, wherein each of the first region and the second region is defined by a separate housing, wherein the air vent unit connects a first housing defining the first region to a second housing defining the second region, and wherein an internal flow path through which the coolant flows is disposed between the first region and the second region, and the control valve is provided on the internal flow path.

15. The integrated structure of the ion filter and the reservoir of claim 14, wherein the first housing is provided with a first outlet through which the coolant is discharged, and wherein the second housing is provided with an inlet into which the coolant flows and a second outlet.

16. The integrated structure of the ion filter and the reservoir of claim 15, wherein when the control valve is closed, the air in the second region flows into the first region through the air vent unit by the coolant flowing into the second housing and the coolant existing inside the ion filter is discharged to the first housing, and wherein when the control valve is opened, the coolant flowing into the second housing flows into the ion filter in the first housing.

\* \* \* \* \*